(12) United States Patent
Gao

(10) Patent No.: US 7,198,366 B2
(45) Date of Patent: Apr. 3, 2007

(54) CASE FOLDING EYEGLASSES

(76) Inventor: Yong Gao, No. 113, Sha Men Road, Wen Zhou, Zhe Jiang (CN) 325000

( * ) Notice: Subject to any disclaimer, the term of this patent is extended or adjusted under 35 U.S.C. 154(b) by 0 days.

(21) Appl. No.: 11/263,345

(22) Filed: Oct. 31, 2005

(65) Prior Publication Data

US 2006/0092373 A1    May 4, 2006

(30) Foreign Application Priority Data

Nov. 1, 2004    (CN) .................... 2004 1 0086772

(51) Int. Cl.
*G02C 5/08* (2006.01)
(52) U.S. Cl. .................... 351/63; 351/111; 351/115
(58) Field of Classification Search ................ 351/63, 351/41, 158, 111, 118, 119, 112, 115; 2/454; 206/5
See application file for complete search history.

(56) References Cited

U.S. PATENT DOCUMENTS 6,102,541 A * 8/2000 Kuo .......................... 351/63

* cited by examiner

*Primary Examiner*—Hung Xuan Dang
(74) *Attorney, Agent, or Firm*—Clement Cheng

(57) ABSTRACT

Eyeglasses can be folded to form a case with a lens and temple bars. The lens and the temple bars form two individual objects of connection. A hinging apparatus connects the lens and the temple bars. One end of the hinging apparatus forms a rotating connection while the other end of the hinging apparatus forms a pivotal connection. The rotating connection and the pivotal connection are perpendicular to each other. Two hollow sections are formed on the temple bars so that turning and locking the hinging apparatus can be store the lenses in a chamber formed by the two hollow sections.

19 Claims, 8 Drawing Sheets

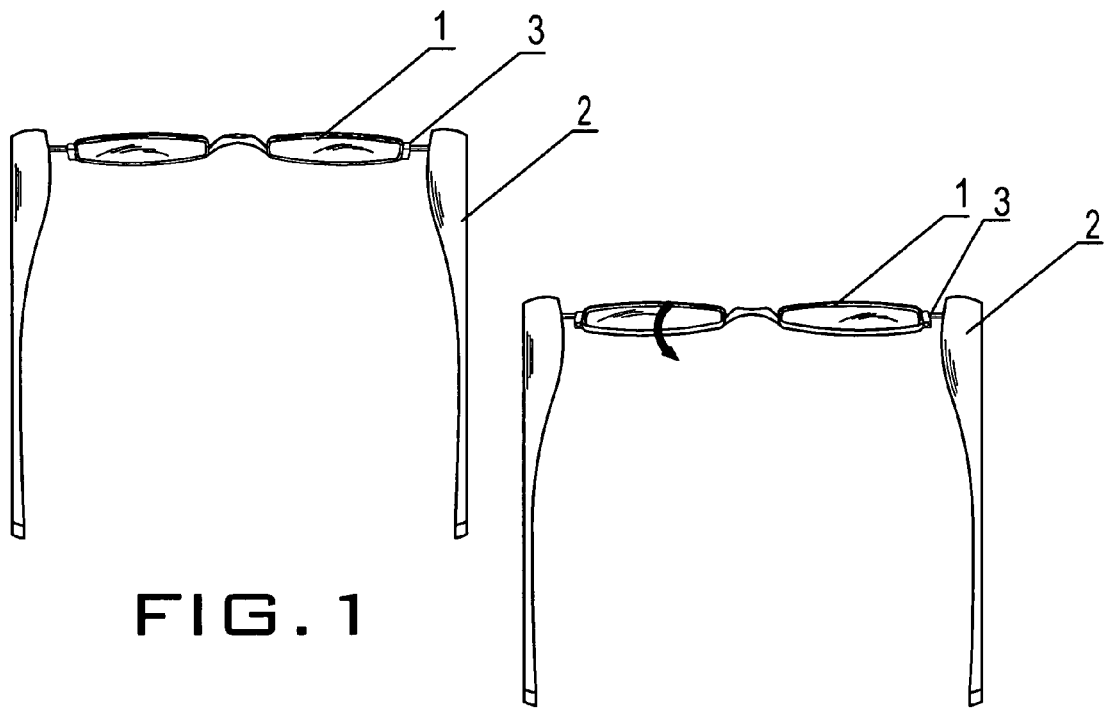
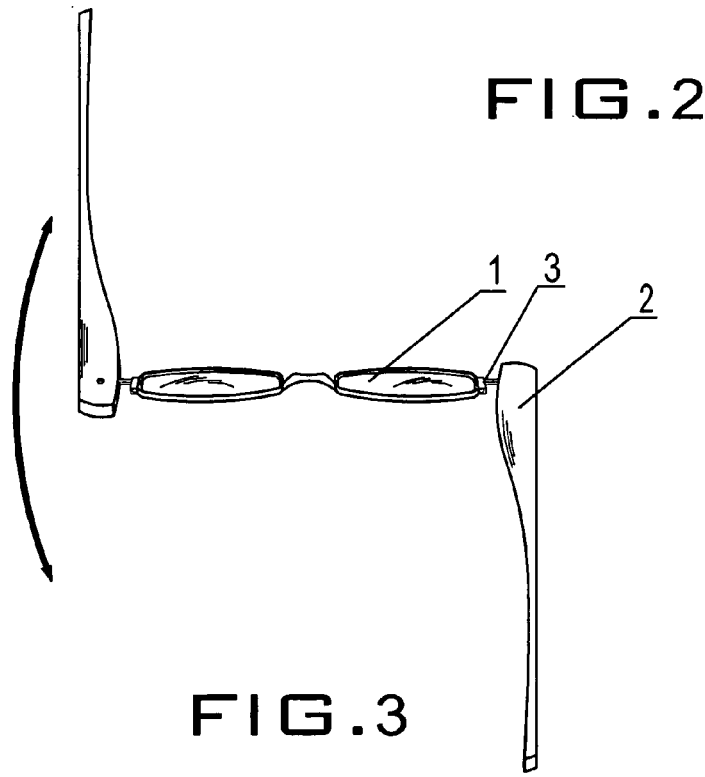
FIG.1
FIG.2
FIG.3

CASE FOLDING EYEGLASSES

This application requests foreign priority from and incorporates by reference attached certified copy China application 200410086772.8 filed Nov. 1, 2004.

FIELD OF THE INVENTION

This invention relates to one kind of eyeglass; it particularly relates to one kind of Eyeglasses that can be folded to form a case.

BACKGROUND

In the case of the common eyeglasses, the temple bars are folded inward and then the eyeglasses are put into an eyeglass case to be carried away. That kind of operation is very inconvenient, particularly for elderly folks who use bi-focal eyeglasses and need to put on and take off the bi-focal eyeglasses frequently.

SUMMARY OF THE INVENTION

This invention overcomes the shortcomings of the current technology by providing Eyeglasses that can be folded to form a case which is easy to use.

To achieve the above-mentioned goal, this invention provides one kind of Eyeglasses that can be folded to form a case that is comprised of lenses and temple bars; a lens and a temple bar are two separate objects of connection; the two are joined together through a hinging apparatus. One end of the hinging apparatus forms a rotating connection with one object of connection; the other end of the hinging apparatus forms a pivotal connection with another object of connection. The rotating connection and the pivotal connection are perpendicular to each other. Two hollow sections are formed on those two temple bars. By turning and locking the hinging apparatus, the lenses can be stored in the chamber formed by the two hollow sections.

The hinging apparatus is a hinging apparatus with a locking position at a set angle.

When not in use, this invention, which is one kind of Eyeglasses that can be folded to form a case, can be conveniently folded into a case with the lenses stored inside the temple bars. That is why this invention is very convenient, particularly for elderly folks who use bi-focal eyeglasses.

The hinging apparatus with a pre-set locking position makes the rotation of the temple bars more precise and makes the closing-up of the temple bars with more ease.

BRIEF DESCRIPTION OF THE DRAWINGS

FIG. 1 is a structural illustration of the eyeglasses as described in Implementation 1 when the eyeglasses are in use.

FIGS. 2, 3, 4, and 5 are illustrations of various states of the eyeglasses as described in Implementation 1 when the eyeglasses are being folded.

DETAILED DESCRIPTION OF THE PREFERRED EMBODIMENT

Implementation 1

Figure 4:
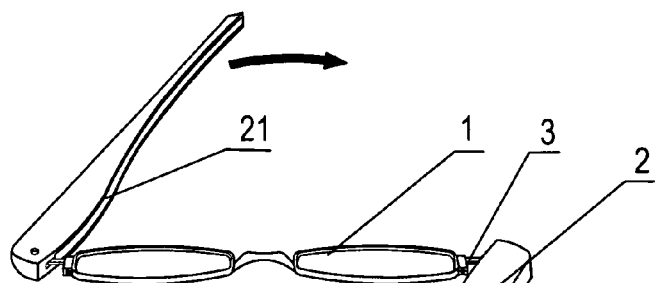
Figure 5:
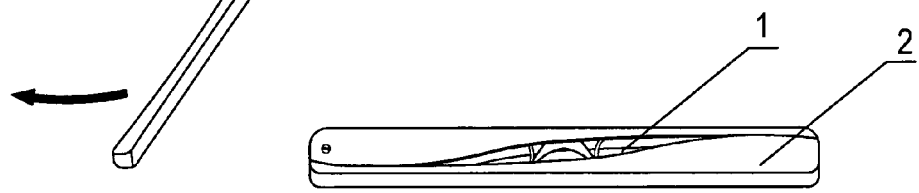
Figure 6:
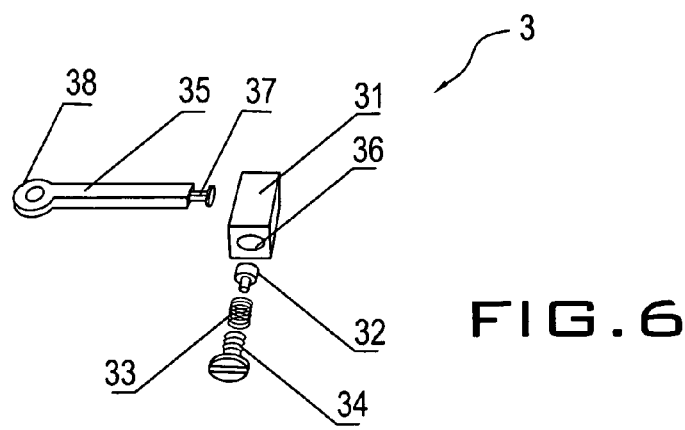
FIG. 6 is a disassembled illustration of the hinging apparatus that joins together the eyeglasses and the temple bars as described in Implementation 1.

FIG. 1 is a structural illustration of the eyeglasses as described in Implementation 1 when the eyeglasses are in use. FIGS. 2, 3, 4, and 5 are illustrations of the changing states of the eyeglasses as described in Implementation 1 when the eyeglasses are being folded. FIG. 6 is a disassembled illustration of the hinging apparatus that joins together the lens and the temple bar.

This invention of one kind of Eyeglasses that can be folded to form a case is comprised of lenses (1) and temple bars (2); a lens (1) and a temple bard (2) are connected to a hinging apparatus (3). The hinging apparatus (3) is comprised of a rotating connection section and a pivotal connection section, as shown in Illustration 3; the rotating connection section includes the anchoring body (31). The anchoring body (31) can be a in the shape of a cube; it is affixed to the outer side of the lens (1); on the anchoring body (31), on the side opposite to the lens, is a hole into which the connecting shaft (35) is inserted. Near the tip of the connecting shaft (35) that sticks into the anchoring body is a recessed neck (37). On the adjacent side is a threaded hole (36) that is at a right angle to the insertion hole. In the threaded hole (36) are installed, in sequence, a depresser (32), a spring (33), and a screw (34). The depresser (32) can be in the shape of a round disk, one end of which presses against the side of the recessed neck (37); the spring (33) pushes again the other end of the depresser (32). The screw (34) is twisted into the threaded hole (36) and depresses the spring (33), which, in turn, pushes the depresser (32) against the surface of the recessed neck (37); as a result, a rotating connection is formed between the connecting shaft (35) and the anchoring body (31), i.e., the connecting shaft (35) can rotate with the recessed neck (37) as the axis.

The other end of the connecting shaft (35) is connected to the front end of the temple bar (2) and forms a pivotal connection. The rotating axis and the pivotal axis are perpendicular to each other, i.e., the axis line of the rotating axis and the axis line of the connecting shaft (35) share the same axis; the axis line of the pivotal axis and the axis line of the connecting shaft (35) are perpendicular to each other. The structure of the pivotal connection can be of a regular structure, for example, the pivotal connection end of the connecting shaft (35) is made into a flat tooth (38); on the tooth (38) is a hole; the tooth (38) in inserted into the temple bar; a screw is inserted from one side of the temple bar (2) and, after going through the hole on the tooth (38), is screwed onto the other side of the temple bar (2). As a result, the temple bar (2) forms a pivotal connection with the connecting shaft (35) by using the screw as the pivot.

On the inner side of each of the two temple bars (2) is a hollow section (21) with an opening that faces the inner side. When the hollow sections (21) on the temple bars are closed together a case with an empty chamber is formed, within which the lenses (1) can be stored.

The hollow section (21) can also be adjacent hollow sections with two openings, i.e., the openings can be on the upper and inner sides of the temple bars (2), so long as the locations of the hollow sections are identical on the two temple bars.

Figure 7:
FIGS. 7, 8, and 9 are structural illustrations of various states of the eyeglasses as described in Implementation 1 when the temple bars are folded.
Figure 8:
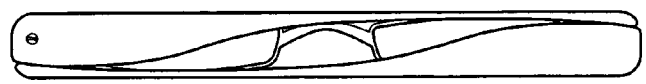
Figure 9:
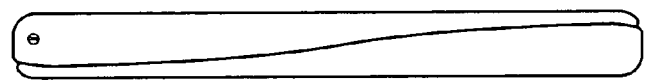
Figure 10:
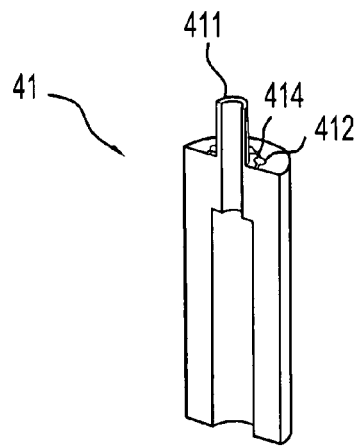
FIGS. 10, 11, and 12 are sectional illustrations of three dimensional views of the hinging apparatus of the eyeglasses as described in Implementation 2.
Figure 11:
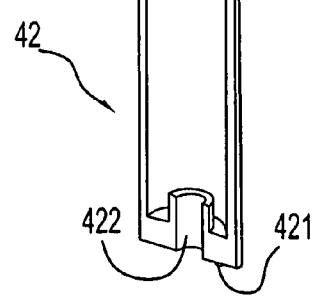
Figure 12:
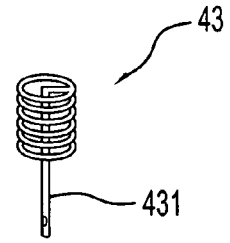

For easy wearing of the eyeglasses, it would be preferable to taper off the temple bars (2) starting from the point where they are connected to the lenses (1); the ends of the temple bars can rest on the ears of the wearer. The shape of the temple bars can take on other shapes, as shown in FIG. 7, 8, 9, so that the case that is formed after the eyeglasses are folded can look different.

When eyeglasses with the preceding configuration are worn, the eyeglasses are in the state shown in FIG. 1, i.e., the temple bar (2) and the surface of the lenses (1) are perpendicular. When the eyeglasses are taken down, the lenses (1) are turned 90° using the connecting shaft (35) as the axis, thereby putting the lenses (1) in a horizontal position as shown in FIG. 2; next, one of the temple bars (2) is rotated 180° using the connecting shaft (35) as the axis, as a result, the two temple bars (2) are placed on opposing sides of the lenses (1), as shown in FIG. 3; next, the two temple bars (2) are pushed inward using the pivotal axis between the temple bars (2) and the connecting shaft as the axis, as shown in FIG. 4, as a result, the lenses are encased within the hollow chamber formed by the hollow sections (21) of the temple bars (2), as shown in FIG. 5; thus, after folding, the lenses (1) are protected within the temple bars (2), which have now formed into a case and are very easy to carry around.

The recessed neck (37) can be in the shape of a polygonal post, as shown in FIG. 6, e.g., a four sided post, such configuration produces pre-set positions that halts the rotation (i.e., rotation in a definite angle); the recessed neck (37) can also be in the shape of a round post which allows a continuous rotation.

Implementation 2

All other conditions are the same as those in Implementation 1, except that the structure of the hinging apparatus (3) between the temple bars (2) and the lenses (1) can be modified. The manner of connection of the hinging apparatus (3) between the connecting shaft (35) and the temple bar (2) can remain unchanged; except that the rotating connection section between the connecting shaft (35) and the lens (1) can be as shown in FIG. 10, 11, 12 and FIG. 13.

Figure 13:
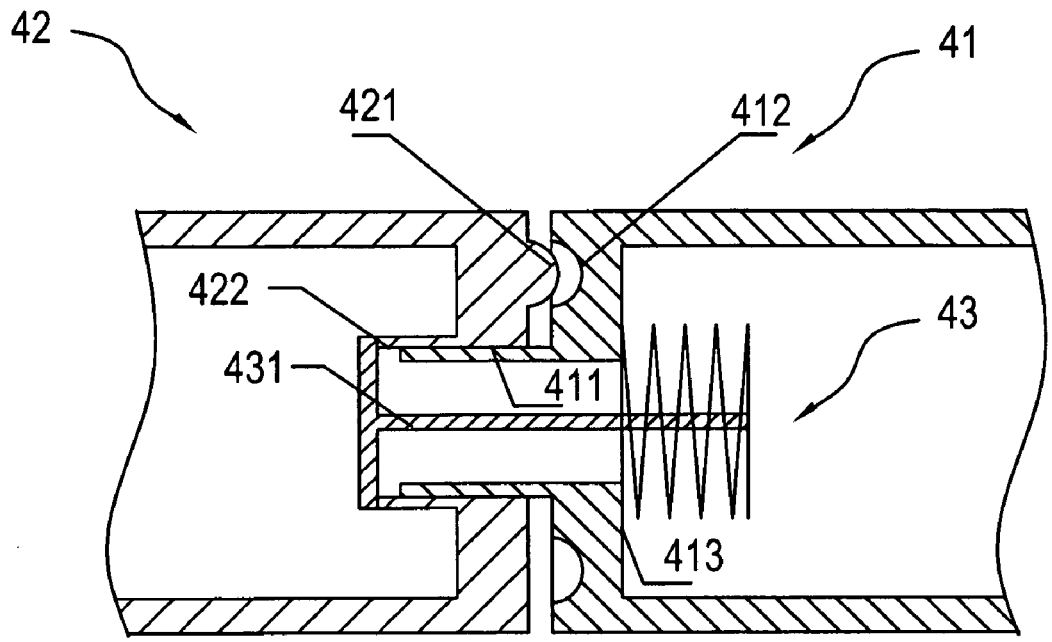
FIG. 13 is a sectional illustration of the rotating connection section of the eyeglasses as described in Implementation 2.

One end of the rotating connection section between the connecting shaft (35) and the lens (1) is the groove section (41); the other end is the ridge section (42); the two are connected by a spring (43). At the tip of the groove section (41) are a number of semi-spherical surfaced or spherical crown surfaced grooves (412) that are evenly distributed along the circumference, i.e., the surface of a groove is smaller than one half of a sphere. A round tubular shank (411) sticks out from the center of the surface of the groove section (41); the round tubular shank (411) should be concentric with the circumference on which a number of grooves (412) are scattered; on the surface of the ridge section (42) is a notch (421) that couples up with the groove (412), i.e., the size and shape of the notch are identical to those of the groove. In the ridge section (42) there are is round tubular hole (422) at a location that corresponds to the shank (411); the shank (411) can be inserted into the round tubular hole (422); together, the two allow a sliding movement. When the shank (411) is inserted into the round tubular hole (422), the notch (421) sets into the groove (412). The groove section (41) and the ridge section (42) match up and form the rotation plane; the spring (43) and the rotation plane are aligned concentrically; the spring (43) can be set inside the groove section (41); one end of the spring (43) pushes against the internal surface (413) that corresponds to the surface of the groove (412); the free end of the spring (43) connects to the inside of the ridge section (42) through a pull rod that passes through the shank (411) and the round tubular hole (422), as a result, the ridge section (42) is connected to the groove section (41) through the spring (43). The pull rod that is mentioned herein, as shown in FIG. 13, can be attached to a recoilless slim rod (431) at the free end of the spring (43); the slim rod (431) passes through the center of the shank (411) and the round tubular hole (422); the other end of the slim rod (431) is in 'T' shape; a bolt can be affixed to the other end to hold it to the inside of the of the groove section (41).

As a result, the groove section (41) and the ridge section (42) can turn with the shank (411) as the axis; the convex ridge (421) glides from one groove (412) to another groove under the elastic effect of the spring (43), which, in turn, allows rotation between the connecting shaft (35) and the lens (1). Because the grooves (412) are not continuous, they produce locking position(s) at certain set angle(s) as the rotation is in progress. If the groves (412) are one continuous circular groove, a continuous rotation is produced.

The groove (412) and the ridge (421) can be semi-oval shaped; such structure can also produce the same result.

It would be best to place arc shaped guiding grooves (414) on the circumference where the multiple grooves (412) are scattered so that the rotation between the ridge section (42) and the groove section (41) is more accurate.

Implementation 3

All other conditions are the same as those in Implementation 2, except that there can be multiple ridges (421) so long as their locations and sizes correspond to the multiple grooves (412).

Implementation 4

Figure 14:
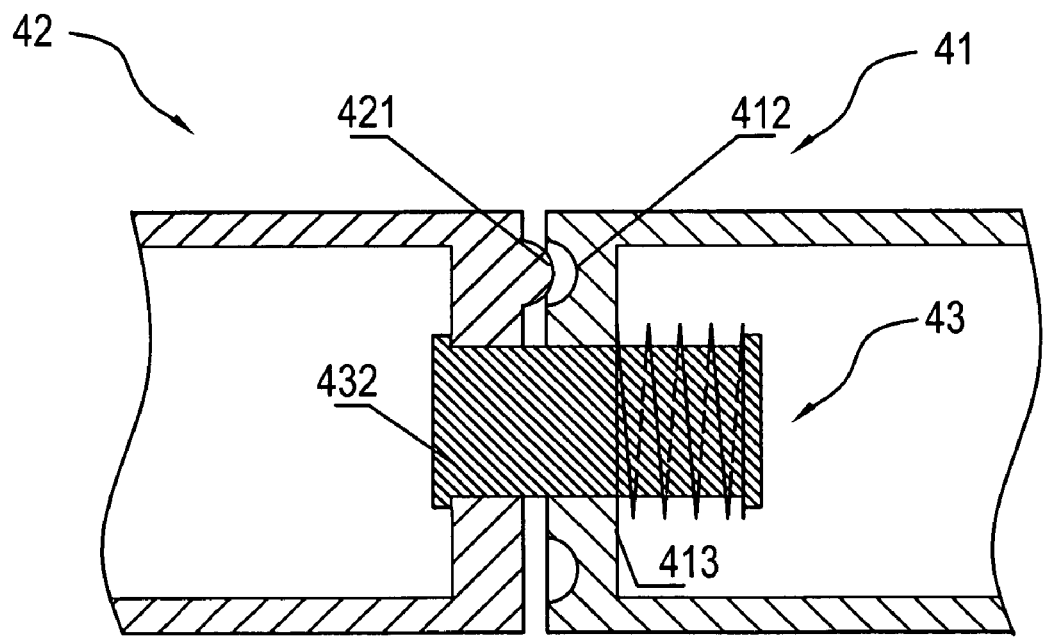
FIG. 14 is a sectional illustration of the rotating connection section of the eyeglasses as described in Implementation 4.
Figures 15, 16, 17:
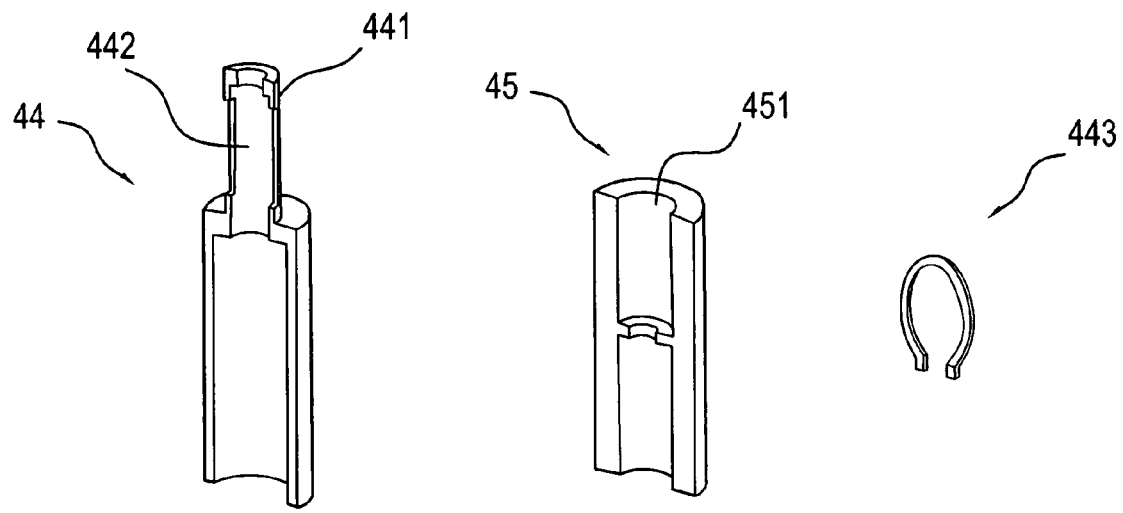
FIGS. 15, 16, and 17 are sectional illustrations of three dimensional views of the rotating connection section of the eyeglasses as described in Implementation 6.
Figure 18:
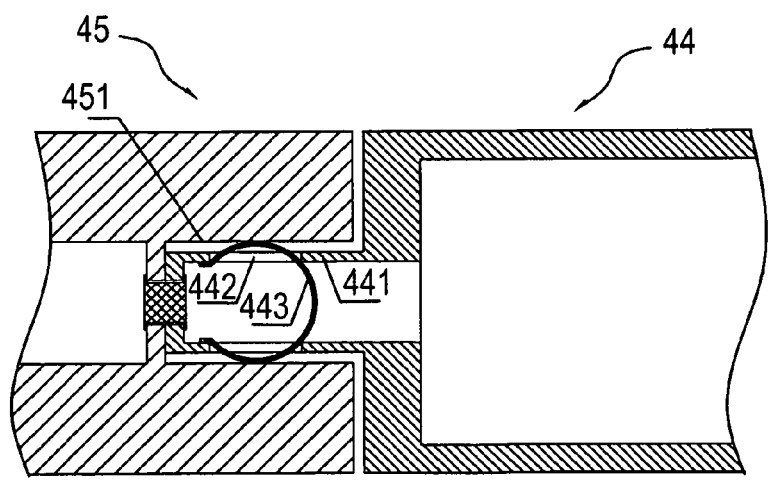
FIG. 18 is a sectional illustration of the rotating connection section of the eyeglasses as described in Implementation 6.

All other conditions are the same as those in Implementation 2 or Implementation 3, except that the pull rod on the spring can be a thick "I" shaped rod (432); as shown in FIG. 14, the two ends of the thick rod (432) can be attached, respectively, to the free end of the spring (43) and the inside surface of the ridge section (42).

Here, the shank (411) can be eliminated. In the middle of the groove section (41) is a round hole that is identical to the round tubular hole (422); the thick rod (432) passes through the round hole and the round tubular hole (422) and forms a sliding union with the two holes.

Implementation 5

All other conditions are the same as those in Implementation 2 or Implementation 3, except that the spring (43) can be placed inside the ridge section (42). Through the same method that is mentioned above, the ridge section (42) and the groove section (41) are connected.

Implementation 6

All other conditions are the same as those in Implementation 1, except that the structure of the hinging apparatus (3) between the temple bar (2) and the lens (1) can be modified. The manner of connection between the temple bar (2) and the connecting shaft (35) of the hinging apparatus (3) can remain unchanged, except that the rotating connection section of the connecting shaft (35) and the lens (1) can be as shown in FIG. 15, 16, 17 and FIG. 18.

At one end of the rotation connection section, which is between the connecting shaft (35) and the lens (1), is a ridge section (44); the other end is a groove section (45); at the end of the ridge section (44) is positioned a raised round tube (441); on either side of the round tube (441) are two rectangular holes (442); within the round tube (441) is placed a circular spring piece (443); the circular spring piece (443) is an elastic ring with an opening; the two open ends of the circular spring piece (443) are inserted into the round tube (441); through the rectangular hole (442), the two sides the left and right sides of the circular spring piece (443) stick out of the round tube (441) thereby allowing the circular spring piece (443) to expand and contract in the direction of the diameter of the round tube (441).

At one end of the groove section (45) is a recessed tubular groove (451); the round tube (441) of the ridge section (44) can stick into the tubular groove (451); the circular spring piece (443) locks in the tubular groove (451); as a result, the circular spring piece is pressed inside the tubular groove (451) thereby allowing the groove section (45) and the ridge section (44) to turn.

The ends of the groove section (45) and the ridge section (44) are connected with bolts or rivets that can turn thereby allowing the groove section (45) and the ridge section (44) to turn but not to be pulled upward in the direction of the axis and be separated.

Implementation 7

Figure 19:
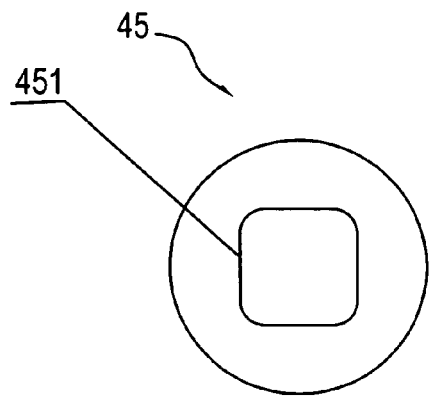
FIG. 19 is a terminal illustration of the groove section as described in Implementation 7.
Figure 20:
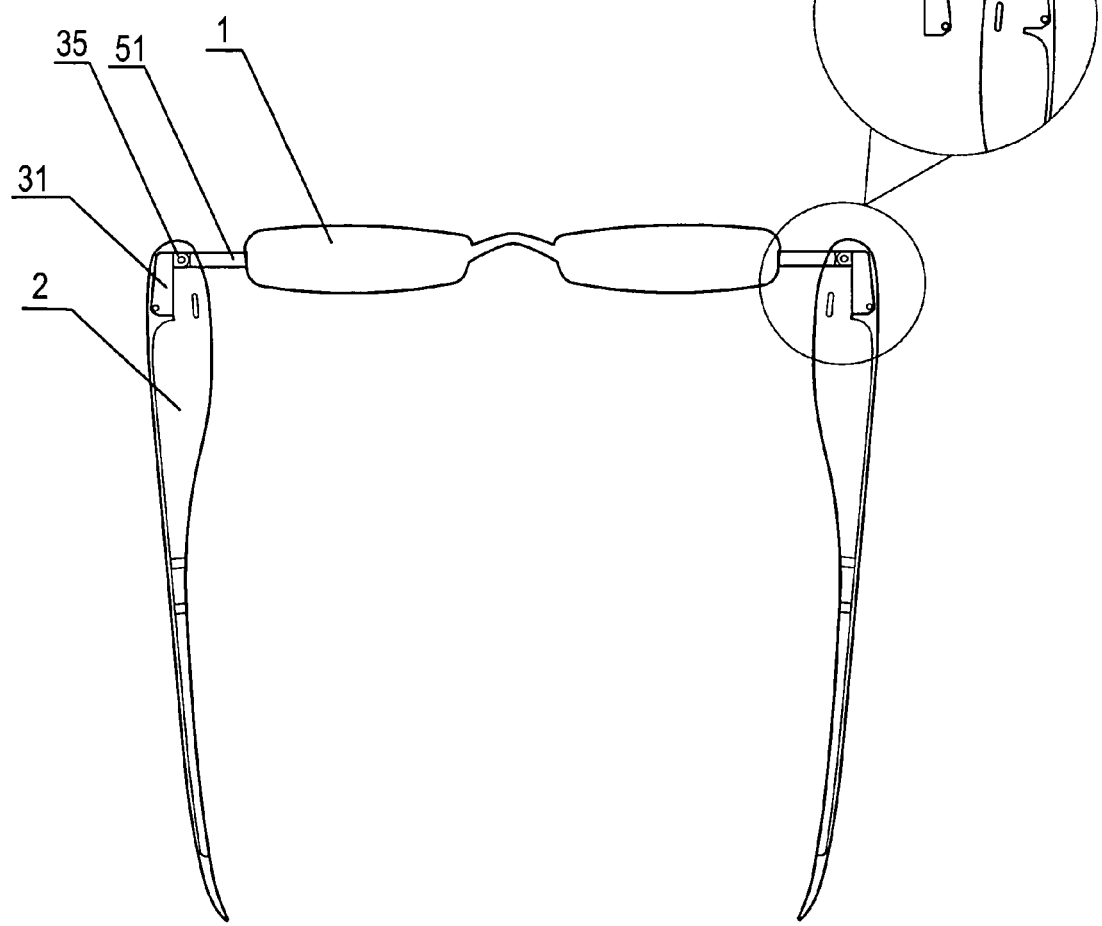
FIGS. 20 and 21 are structural illustrations of the eyeglass as described in Implementation 8 when the eyeglasses are open and folded.
Figure 21:
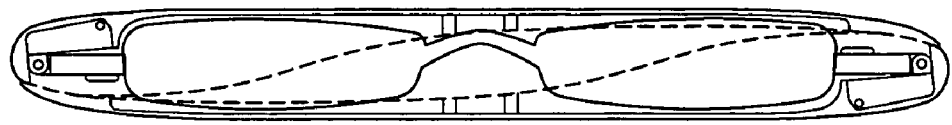
Figure 22:
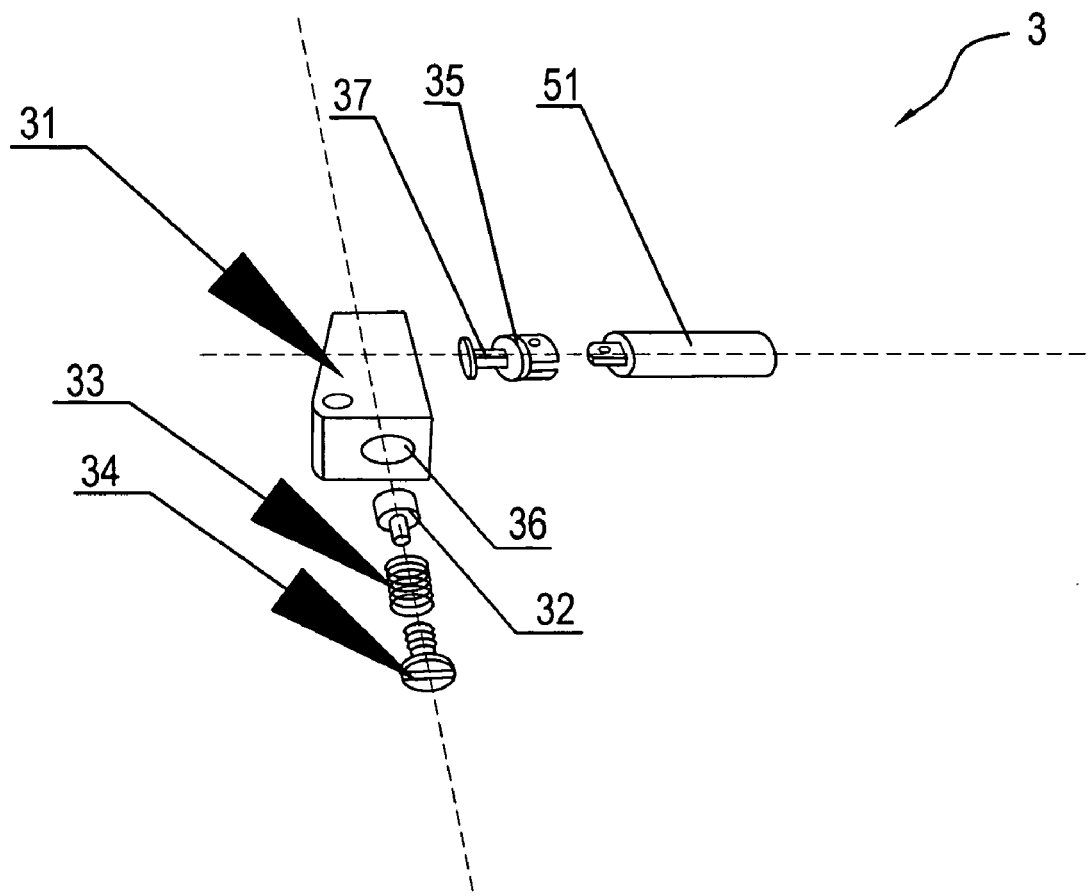
FIGS. 22 and 23 are disassembled illustrations of the hinging apparatus between the lens and the temple bar as described in Implementation 8.
Figure 23:
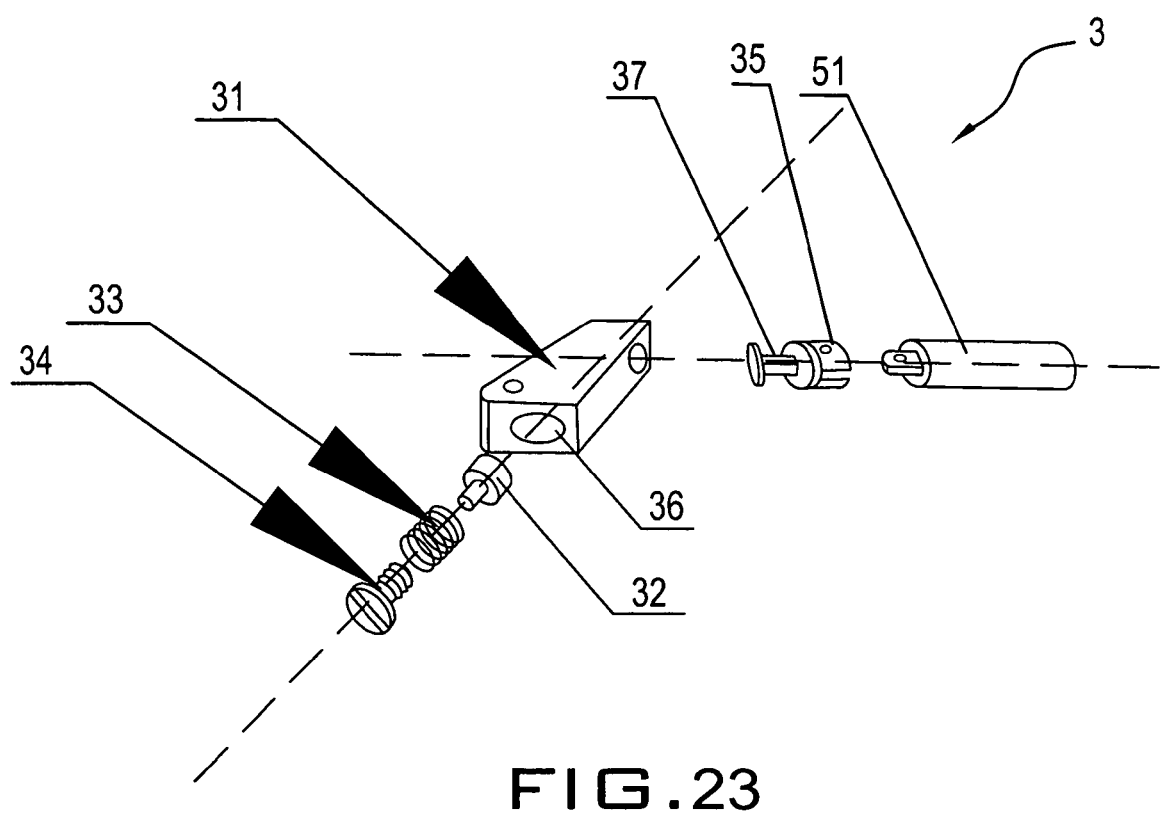

All other conditions are the same as those in Implementation 6, except that the tubular groove (451) in the groove section (45) can be in the shape of a round tube or a polygonal tube, such as in cubical shape, the cross-section view of which is shown in FIG. 19; it can also be in the shape of a hexagonal tube. In order to facilitate the gliding of the circular spring piece (443) on its surface, the two adjacent sides of the tube is best formed in the shape of an arc; this kind of tubular shape makes it possible to achieve rotation with locking positions at certain pre-set angles.

Implementation 8

All other conditions are the same as those in Implementation, i.e., the structure of the rotating connection section is the same as that in Implementation 1, except that, as shown in FIGS. 20 and 21 and FIGS. 22 and 23, the anchoring body (31) of the rotating connection section is fixed to the inner side of the temple bar (2); the anchoring body (31) is the same as that in Implementation 1; a hole is placed on the side of the anchoring body (31) that faces the lens (1); the length of the connecting shaft (35) is comparatively shorter; one end of it i.e., the connecting shaft is inserted into that hole; near the tip of the insertion end of the connecting shaft (35) is a recessed neck (37); on the adjacent side is a threaded hole that is 90° relative to the insertion hole; in the threaded hole (36) are installed, in sequence, a depresser (32), a spring (33), and a screw (34); the depresser (32) can be in the shape of a round disk, the surface of which pushes against the side of the recessed neck (37); the spring (33) presses against the other end of the depresser (32). The screw (34) is twisted into the threaded hole (36); it depresses the spring (33), which in turn pushes the depresser (32) against the surface of the recessed neck (37); as a result, a rotating connection is formed between the connecting shaft (35) and the anchoring body (31), i.e., the connecting shaft (35) is able to turn using the recessed neck (37) as the turning axis.

The other end of the connecting shaft (35) forms a pivotal connection with a connector (51) which is connected to the outer side of the lens (1), i.e., there is a groove at the other end of the connecting shaft (35); in the middle, perpendicular to the groove is a threaded hole; the connecting shaft (35) and the protruded end of the connector (51) are connected together with a screw, thus forming a pivotal connection with the screw as the axis; the rotating axis and the pivot are perpendicular to each other; other usual structure can be adopted as the structure of the pivotal connection.

Implementation 9

All other conditions are the same as those in the above Implementation, except that the lens (1) is affixed by the lens frame, the hinging apparatus (3) forms a hinge with the lens (1) through the lens frame.

The invention claimed is:

1. Eyeglasses that can be folded to form a case comprising:
   a. a lens forming a plane and having an edge;
   b. temple bars; wherein the lens and the temple bars form two individual objects of connection;
   c. a hinging apparatus connecting the lens and the temple bars; wherein one end of the hinging apparatus forms a rotating connection that rotates on an axis perpendicular to the plane of the lens while the other end of the hinging apparatus forms a pivotal connection; wherein the rotating connection and the pivotal connection are perpendicular to each other; and
   d. two hollow sections formed on the temple bars; whereby by turning and locking the hinging apparatus, each temple bar hollow section closes over said edge of the lens, wherein the lenses can be stored in a chamber formed by the two hollow sections.

2. Eyeglasses that can be folded to form a case according to claim 1, wherein the hinging apparatus is a hinging apparatus with a locking position at a predetermined angle.

3. Eyeglasses that can be folded to form a case according to claim 1, wherein the lens is held in place by the lens frame, and the hinging apparatus is connected to the lens through the lens frame.

4. Eyeglasses that can be folded to form a case according to claim 1, wherein the structure of the rotating connection of the hinging apparatus further comprises: an anchoring body with a hole on the side adapted to receive one end of a connecting shaft of the hinging apparatus; a recessed neck located on the connecting shaft near the end inserted into the body; a threaded hole positioned at 90° relative to an insertion hole on an adjacent side; wherein in the threaded hole are installed, a depresser, a spring, and a screw; wherein the screw is twisted into the threaded hole and through the spring, the depresser is pushed against the surface of the recessed neck and a rotating connection is formed between the connecting shaft and the body.

5. Eyeglasses that can be folded to form a case according to claim 4, wherein the recessed neck is in the shape of a polygonal column or a round column.

6. Eyeglasses that can be folded to form a case according to claim 4, wherein the anchoring body is fixed to the inner side of the temple bar, the other end of the connecting shaft forms a pivotal connection with an intermediary connector which is connected to the outer side of the lens.

7. Eyeglasses that can be folded to form a case comprising:
   a. a lens;
   b. temple bars; wherein the lens and the temple bars form two individual objects of connection;
   c. a hinging apparatus connecting the lens and the temple bars; wherein one end of the hinging apparatus forms a rotating connection while the other end of the hinging apparatus forms a pivotal connection; wherein the rotating connection and the pivotal connection are perpendicular to each other; and
   d. two hollow sections formed on the temple bars; whereby by turning and locking the hinging apparatus, wherein the lenses can be stored in a chamber formed by the two hollow sections;

wherein on the first end of the connecting shaft of the hinging apparatus that connects to the rotating connection section is a groove section; wherein on a second other end is the ridge section; wherein the groove section and ridge section are coupled together through a spring; wherein on the surface of a tip of the groove section is a number of spherical-surfaced grooves distributed along the circumference; wherein on the surface of the tip of the ridge area are ridges that couple with the grooves; wherein the groove section and the ridge section mate and form a rotation plane; wherein the spring and the rotation plane are aligned concentrically; wherein the fixed end of the spring is set inside one end of the rotating connection section; wherein the free end of the spring is connected to the pull rod; wherein the pull rod passes through the rotation plane and is anchored inside the other end of the rotating connection section.

8. Eyeglasses that can be folded to form a case according to claim 7, wherein the hinging apparatus is a hinging apparatus with a locking position at a predetermined angle.

9. Eyeglasses that can be folded to form a case according to claim 7, wherein the lens is held in place by the lens frame, and the hinging apparatus is connected to the lens through the lens frame.

10. Eyeglasses that can be folded to form a case according to claim 7, wherein the grooves have a round or elliptical surface.

11. Eyeglasses that can be folded to form a case according to claim 7, wherein on the circumference where the grooves are present are placed arc shaped guiding grooves.

12. Eyeglasses that can be folded to form a case according to claim 7, wherein the grooves are round grooves.

13. Eyeglasses that can be folded to form a case according to claim 7, further comprising a round tubular shank protruding from the middle of the surface of the groove section; wherein the round tubular shank is concentric with the circumference on which a number of grooves are scattered; on the ridge section there is a round tubular hole at a location that corresponds to the shank; the shank sticks into the round tubular hole to perform a sliding movement.

14. Eyeglasses that can be folded to form a case comprising:
   a. a lens;
   b. temple bars; wherein the lens and the temple bars form two individual objects of connection;
   c. a hinging apparatus connecting the lens and the temple bars; wherein one end of the hinging apparatus forms a rotating connection while the other end of the hinging apparatus forms a pivotal connection; wherein the rotating connection and the pivotal connection are perpendicular to each other; and
   d. two hollow sections formed on the temple bars; whereby by turning and locking the hinging apparatus, wherein the lenses can be stored in a chamber formed by the two hollow sections;

wherein the hinging apparatus has a ridge and groove connection, wherein at the end of the ridge section is fashioned a raised round tube; wherein on a side of the round tube is placed a springing mechanism that can expand and contract in the direction of the its path; wherein at one end of the groove section is a recessed tubular groove; wherein the round tube of the ridge section can stick into the tubular groove; wherein the flexible mechanism is locked within the tubular groove; wherein the contact surfaces of the round tube and the tubular groove are assembled together in such a way that would allow the groove section and the ridge section to turn but not to be pulled upward in the direction of the axis.

15. Eyeglasses that can be folded to form a case according to claim 14, wherein the hinging apparatus is a hinging apparatus with a locking position at a predetermined angle.

16. Eyeglasses that can be folded to form a case according to claim 14, wherein the lens is held in place by the lens frame, and the hinging apparatus is connected to the lens through the lens frame.

17. Eyeglasses that can be folded to form a case according to claim 14, wherein the springing mechanism is constructed as follows: on opposing sides of the round tube are two rectangular holes; within the round tube is installed a circular spring piece; the circular spring piece is a springing ring with an opening; the two open ends of the circular spring piece are inserted into the round tube; through the rectangular hole, the two ends of the circular spring piece protrude from the round tube thereby allowing the circular spring piece to expand and contract in the direction of the diameter of the round tube.

18. Eyeglasses that can be folded to form a case according to claim 14, wherein the tubular groove is in the shape of a round tube.

19. Eyeglasses that can be folded to form a case according to claim 14, wherein the tubular groove is in the shape of a polygonal tube; wherein the area between the two adjacent sides of the polygonal column is in the shape of an arc.

* * * * *